Dec. 1, 1959   F. S. HAMLIN ET AL   2,915,298
TEMPERATURE CONTROL SYSTEM
Filed April 22, 1955
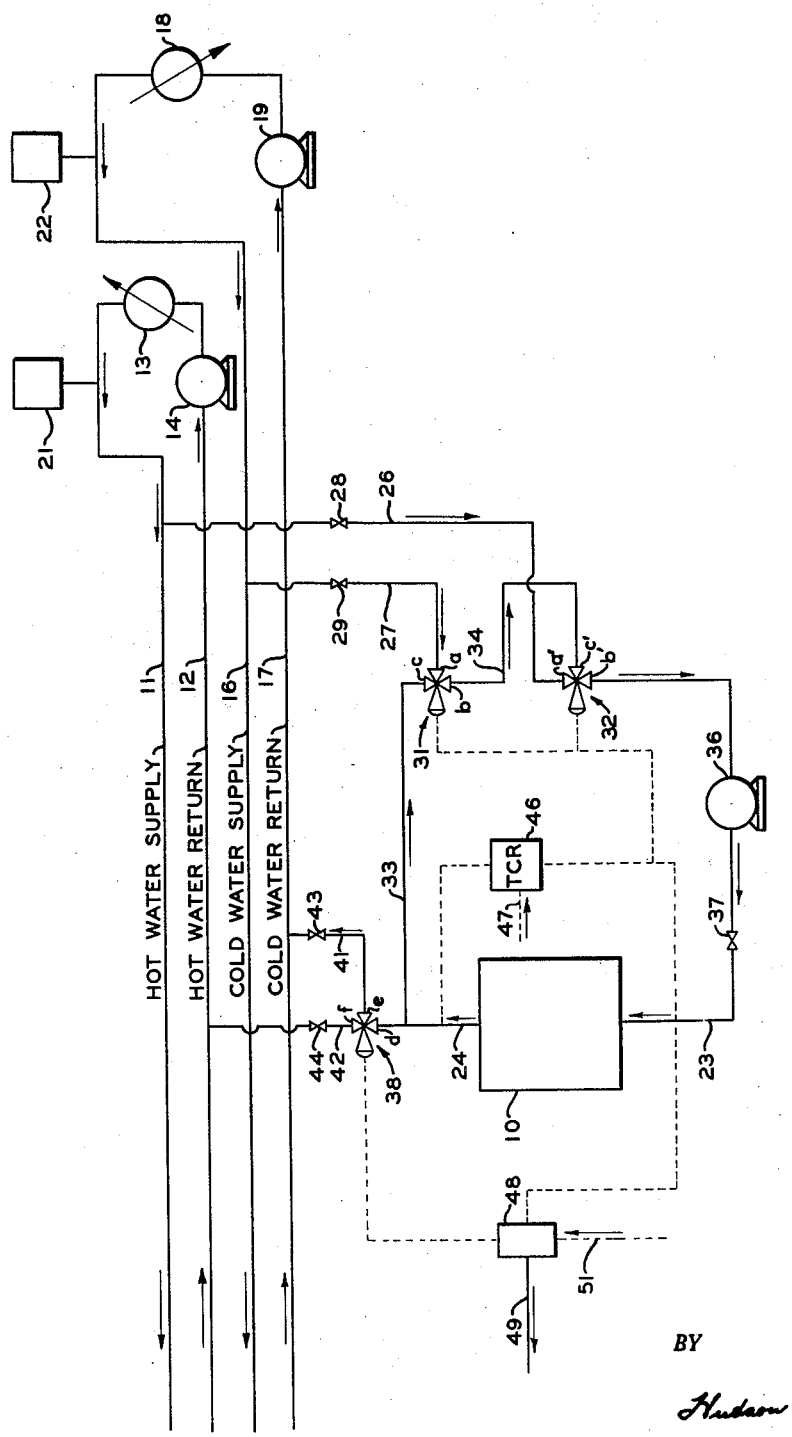
INVENTORS.
F. S. HAMLIN
J. D. HOLMES
B. S. BROOKS
H. A. SWANSON, JR
BY
Hudson and Young
ATTORNEYS United States Patent Office 2,915,298
Patented Dec. 1, 1959

2,915,298

TEMPERATURE CONTROL SYSTEM

Frank S. Hamlin, Waco, John D. Holmes and Byron S. Brooks, McGregor, and Herman A. Swanson, Jr., Waco, Tex., assignors to Phillips Petroleum Company, a corporation of Delaware Application April 22, 1955, Serial No. 503,096

6 Claims. (Cl. 257—288)

This invention relates to a temperature control system. In one aspect, it relates to a method for automatically controlling the temperature of processing equipment by circulating heat exchange liquid of variable temperature. In another aspect, it relates to means for controlling the temperature of processing equipment utilized in the manufacture of various products.

In the manufacture of many products, processing equipment is used which must be operated so that the temperature of the equipment is maintained in a narrow temperature range. Operation so as to maintain a substantially constant temperature is important in order that a consistently uniform product may be produced. Depending upon the type of operation, processing equipment may generate heat, in which case it will be necessary to provide for its removal, or, in some cases, it may be necessary to supply heat to the equipment in order to maintain the material being processed at a desired temperature. Furthermore, in a single manufacturing operation, both types of processing equipment may be required, i.e., that which requires cooling and the type which requires heating. For example, in the manufacture of solid rocket propellants, processing equipment is utilized which requires both heating and cooling in order to maintain a desired constant temperature. Such equipment includes roll mills and mixers, which require cooling, and extrusion presses and screw extruders, which require heating and/or cooling.

In a conventional method of temperature control, each individual piece of equipment in an assembly line is serviced separately by circulating a cooling or heating medium as applicable in indirect heat exchange relation therewith. After the heat exchange, the heat exchange fluid is returned to the cooler or heater with the result that the return system carries the entire load. The heat gains or losses when using such a method of control are large, resulting in an inefficient and expensive operation which requires a large outlay in cooling and heating requirements. In accordance with this invention, a temperature control system is provided which is well adapted for servicing simultaneously a large number of pieces of equipment which may be operating at once at wide variations in temperature. Furthermore, utilization of the control system of this invention results in a material saving in cooling and heating requirements as compared to conventional control systems.

The following are objects of the invention.

It is an object of this invention to provide a system for controlling the temperature of processing equipment. Another object of the invention is to provide a method for automatically controlling the temperature of processing equipment by circulating heat exchange liquid of variable temperature. Yet another object of the invention is to provide controlled amounts of variable temperature heat exchange liquid to various parts of a single piece of process equipment. Still another object of the invention is to provide a temperature control system adapted to service simultaneously a large number of pieces of equipment which may be operating at once at wide variations in temperatures. A further object of the invention is to provide a temperature control means for processing equipment, which includes a closed heat exchange liquid circulating system which requires no make-up water nor blow-down. Yet a further object of the invention is to provide a temperature control system comprising a central heat exchange liquid circulating system which is adapted to service the several heat exchangers of one or more groups of processing equipment. A still further object of the invention is to provide a temperature control system which is adapted for use in conjunction with the production of solid rocket propellants. Still other and further objects and advantages of the invention will become apparent to one skilled in the art upon consideration of the accompanying disclosure.

Broadly speaking, the present invention resides in a method and means for automatically controlling the temperature of processing equipment. In a broad aspect, the method of this invention comprises measuring the temperature of the heat exchange fluid effluent from the processing equipment whose temperature is to be controlled, at certain predetermined temperatures recirculating the entire quantity of the effluent through the equipment, and at other predetermined higher and lower temperatures blending or mixing a portion of the effluent with cold or hot heat exchange fluid, the mixture then being circulated through the equipment. The remainder of the effluent which is not circulated through the equipment is combined with either the hot or the cold fluid depending upon the effluent temperature.

In a more specific aspect, the invention resides in the temperature control system comprising lines in which hot water is continuously circulated, lines in which cold water is continuously circulated, means for mixing a controlled amount of hot or cold water from the aforementioned lines with effluent water prior to passage through the equipment whose temperature is to be controlled so that the temperature of the effluent is maintained at a desired level. Means are also included for controlling the flow of effluent so that an amount of effluent equal to the amount of added hot or cold water is returned to the hot or cold water lines, depending upon the temperature of the effluent.

For a more complete understanding of the invention, reference may be had to the following description and drawing which is a diagrammatic representation and flow diagram illustrating the invention.

Referring now to the drawing, reference numeral 10 designates a piece of processing equipment whose temperature it is desired to control within narrow limits. As mentioned hereinabove, the temperature control system is especially well adapted for use with processing equipment such as roll mills, extrusion presses, screw extruders and mixers employed in the production of solid propellants. With this type of equipment, a heat exchange liquid is passed or circulated in indirect heat exchange relation therewith so as to provide the desired cooling or heating effect. For example, in the case of a roll mill, the heat exchange liquid is usually circulated through the rollers while with mixers hollow mixing arms are generally provided for circulation of the liquid. In extrusion presses of the ram type, the cylinder in which the ram moves is usually provided with a heating coil or jacket while the die of the press is provided with a cooling coil. Screw extruders ordinarily do enough work on the materials to provide the heat required for proper fluidity, but as with extrusion presses the die is usually provided with a cooling coil. The processing equipment, as discussed, are in general commercially available items of manufacture, and it is not intended to limit the invention to any specific type of equipment. In general, the control system of this invention can be used in conjunction with any processing equipment whose temperature can be controlled by heat exchange relation with a heat exchange liquid. For example, in the rubber and plastics industries equipment is utilized which is very similar to that mentioned herein and with which this invention can be advantageously employed.

Lines 11 and 12 serve respectively as the supply and return lines for the hot heat exchange liquid. The liquid is continuously circulated through these lines and through heater 13 by means of pump 14. Heater 13 can be any conventional type of indirect heat exchanger, such as a boiler, suitable for heating a liquid to a desired temperature. Chilled heat exchange liquid is continuously circulated through supply line 16, return line 17, and chiller 18 by means of pump 19. Chiller 18 may also be a conventional type of indirect heat exchanger which is capable of cooling the heat exchange liquid to a desired temperature. For example, chiller 18 may comprise a container having coils disposed therein through which a suitable refrigerant is circulated. Surge tanks 21 and 22, connected to supply lines 11 and 16, respectively, provide means for taking care of any excess liquid which may be present in the system. When the system requires additional liquid as a result of losses caused, for example, by leaks or evaporation, the make-up liquid can advantageously be introduced into the surge tanks.

The heat exchange medium utilized in the temperature control system is a liquid, and any well known heat exchange medium which remains in liquid form at the operating temperatures can be used. With processing equipment employed in the production of solid rocket propellants, water is the preferred heat exchange liquid, and the invention will be specifically described hereinafter with relation to this heat exchange liquid. It has been found that water can be circulated through the hot and cold water lines at a wide enough temperature range, e.g., 40° F. and 200° F., to provide the close temperature control desired with this specific equipment. It is not intended, however, to limit the invention to water, for other well known heat exchange liquids can be used. Examples of other heat exchange liquids include methanol, ethanol, propanol, glycol, diethylene glycol, dipropylene glycol, triethylene glycol, etc., and mixtures of these materials. It is also within the scope of the invention to use kerosene and other liquid hydrocarbons as the heat exchange liquid. The specific heat exchange liquid selected depends among other factors on the temperature at which the processing equipment is to be maintained. For example, if the equipment is to be operated at a temperature considerably above 200° F., e.g., at temperatures approaching 400° F. and above, it may be desirable to employ a liquid such as triethylene glycol. In any case the heat exchange liquid is such that when heated or cooled to the amount required to obtain the desired temperature range, neither boiling, freezing or decomposition of the liquid will result. It is also within the scope of the invention to operate the system at pressures above atmospheric so as to permit the liquid to be circulated at higher temperatures without boiling off any of the circulated liquid. Water can also be mixed with an antifreeze agent such as those mentioned hereinabove in order to obtain a wider temperature range. Furthermore, it is within the contemplation of the invention to add a rust inhibitor, such as sodium or potassium dichromate, acetaldehyde, quachrome glucosate, onion juice and other natural or synthetic glycidic inhibitors to the heat exchange liquid.

Water, which is passed in indirect heat exchange relation with equipment 10, is introduced into the cooling or heating coils or jacket of the equipment through line 23 and withdrawn therefrom through line 24. The control system of this invention includes means for recirculating a portion or all of the effluent water to the equipment and means for blending or mixing effluent water with hot or cold water flowing from hot water supply line 11 through line 26 and from chilled water supply line 16 through line 27. Lines 26 and 27 each contain a flow control means such as globe valves 28 and 29 which during normal operation are in an open position. Thus, the control system includes a chilled water mixing valve 31 and a hot water mixing valve 32. Valves 31 and 32, as illustrated, are three way diaphragm, split range modulating valves which can be set to operate within a desired instrument output air pressure range. The mixing valves are commercially available items, and type F25-three way control valves manufactured by the Foxboro Company of Foxboro, Massachusetts, have been found to give very satisfactory operation. For convenience of description, the three ports of valve 31 are designated by letters $a$, $b$ and $c$ while $a'$, $b'$, and $c'$ indicate the ports of valve 32. As illustrated, line 33 connects effluent line 24 with port $c$ of valve 31 while line 23 connects port $b'$ of valve 32 with the inlet to equipment 10. Cold water line 27 is connected to a port $a$ of valve 31, and hot water line 26 is attached to port $a'$ of valve 32. Line 34 connects port $b$ of valve 31 to port $c'$ of valve 32. Line 23, connected between port $b'$ of valve 32 and equipment 10, contains a pump 36 and a liquid flow regulating means 37 which operates so that water is supplied to equipment 10 at a constant rate of flow. The flow regulating means is preferably a self-operated flow regulator, and a suitable flow regulator of the self-operating type may be obtained from the Fischer and Porter Company of Hatboro, Pennsylvania.

Effluent outlet line 24 downstream from its juncture with line 33 contains a three-way diaphragm, split range, diverting valve 38. The ports of this valve are designated by letters $d$, $e$ and $f$. Effluent line 24 is connected to port $d$ while ports $e$ and $f$ are connected respectively to lines 41 and 42. Line 41 is further connected to the cold water return line 17 whereas line 42 leads to hot water return line 12. Lines 41 and 42 each contain a flow control means such as globe valves 43 and 44. The globe valves provided in lines 26, 27, 41 and 42 provide means for taking an individual piece of processing equipment out of a temperature control system which is servicing several pieces of such equipment.

Valves 31, 32 and 38 are pneumatically operated by an air signal which is proportional to the temperature of the effluent water removed from equipment 10 through line 24. It is also within the scope of the invention to measure the temperature of the equipment itself, e.g., the temperature of the rollers of a roll mill, but it has been found that more accurate control can be maintained when basing the control upon the temperature of the effluent water. Accordingly, temperature controller recorder 46 is operatively connected to effluent line 24 and to each of the three valves 31, 32 and 38. Instrument air is supplied to the control system through lines 47 and 51. Temperature controller recorder 46 delivers a decreasing air output with temperature rises and an increasing air output with temperature drops. It is to be understood that a controller recorder can be employed which delivers an increasing air output with temperature rises and a decreasing air output with temperature drops without departing from the scope of the invention. A temperature controller recorder suitable for use in conjunction with this invention can be obtained from the Taylor Instrument Companies of Rochester, New York.

Valve 38 is a two-position, diverting valve which operates, depending upon the output air pressure of the controller recorder, so that either ports $d$—$e$ or $d$—$f$ are open. In order that valve 38 may be snap-acting, the air line to this valve is provided with a three-way pilot valve 48. The pilot valve below a certain set pressure operates to permit air to bleed from valve 38 through line 49 connected to one of the ports of the pilot valve. Above the set pressure, the pilot valve functions to supply instrument air from line 51 directly to the diaphragm of valve 38. Thus, valve 38 is maintained in one or the other of two positions depending upon the pneumatic signal transmitted by temperature controller recorder 46 to pilot valve 48. As a result of the inclusion of the pilot valve, the action of valve 38 in changing from one or the other of the two positions is practically instantaneous. As a result, the portion of the effluent water which is not recirculated through line 33 is passed either through line 41 to the cold water return line or through line 42 to the hot water return line. Whether this portion of the effluent water is passed to one or the other of these return lines is dependent upon the temperature of the effluent water itself, the temperature of which indirectly controls the operation of diverting valve 38. A three-way pilot valve which can be advantageously used is manufactured by the Taylor Instrument Companies.

In describing the temperature control system of this invention, applicant has referred to specific types of valves and instruments which can be utilized. It is not intended, however, to limit the invention to any specific type of apparatus, for any suitable means which can perform the function of the apparatus as described can be utilized. The temperature controller-recorder has been described as a pneumatic type of control instrument and the valves have been described as pneumatically operated valves, but it is within the scope of the invention to use electrically operated equipment. While the invention has been illustrated and described as it relates to a single piece of processing equipment, it is to be understood that ordinarily the heat exchange liquid circulating system would be used to service one or more complete assembly lines at the same time. In an assembly line operation, similar mixing and diverting valves would be provided in lines connected to the heat exchange liquid circulating system and to each piece of processing equipment as shown in the drawing. It is to be understood also that each piece of processing equipment would be provided with its own temperature controller-recorder. It is within the scope of the invention, however, to arrange several pieces of similar processing equipment, which are to be maintained at about the same temperature, in parallel so that only a single set of mixing and diverting valves and a single temperature controller-recorder are required for the entire group. In certain cases where a piece of equipment requires both cooling and heating, it is necessary to provide separate temperature control for both the cooling and the heating requirement for that particular piece of equipment.

In the operation of the control system, each of the valves are given definite pressure range settings. While the settings can vary and will depend somewhat upon the specific instruments employed, it has been found that with an instrument air supply pressure of 15 p.s.i. and above temperature control can be closely maintained by giving valve 31 a split range setting of 3 to 8 p.s.i. and valve 32 a split range setting of 10 to 15 p.s.i. With these settings valve 31 operates with ports a—b fully open with 3 p.s.i. or less on the system and with ports c—b fully open with 8 p.s.i. or more on the system. When ports a—b are fully open, ports c—b are fully closed, and vice versa. Between 3 and 8 p.s.i., the ports of the valve are only partially closed. In the case of valve 32, ports a'—b' are fully open with 15 p.s.i. or more on the system while ports c'—b' are fully open with 10 p.s.i. or less on the system. At a pressure of 10 p.s.i. ports a'—b' are fully closed while at 15 p.s.i. ports c'—b' are fully closed. Between 10 and 15 p.s.i. the ports are only partially closed.

As previously described, diverting valve 38 is in either one or the other of two positions depending upon the setting of pilot valve 48. Accordingly, pilot valve 48 is set at 9 p.s.i. so that when the pressure on the system is less than 9 p.s.i., air is bled from valve 38, permitting ports d—f to be fully open. When the pressure on the system is less than 9 p.s.i., instrument supply air at 15 p.s.i. or greater is passed to valve 38, and ports d—e are then fully opened. When ports d—f are fully opened, ports d—e are fully closed, and vice versa. With a pressure of 9 or 10 p.s.i. on the system, all of the effluent water is recirculated to equipment 10. As previously noted, temperature controller-recorder 46 supplies a decreasing air output with rises in temperature. When the temperature of the effluent water is higher than the control temperature, i.e., the temperature at which it is desired to maintain the processing equipment, the air pressure on the system is below 9 p.s.i. and a portion of the effluent water is passed to hot water return line 12 through line 42. On the other hand, an effluent temperature below the control temperature results in the air pressure on the system being above 9 p.s.i., and a portion of the effluent water is passed to chilled water return line 17 through line 41. By operating in this manner rather than returning the effluent to the hot or cold water return lines regardless of its temperature, the heating and cooling load placed upon the system is materially reduced.

The water passed in indirect heat exchange with equipment 10 is of a variable temperature which depends upon the air output signal delivered by temperature controller recorder 46 to valves 31 and 32. The temperature controller-recorder is initially given a setting corresponding to the temperature at which it is desired to maintain the effluent water upon its withdrawal from the equipment. As noted above, the water is at all times supplied to the equipment at a constant flow rate, and by observing the operation of the equipment the correct effluent temperature required to maintain the equipment at a substantially constant temperature can be easily determined. With an air pressure of 3 p.s.i. or less, cold water only is supplied to the equipment while at pressures above 3 p.s.i. and up to and including 8 p.s.i. a mixture of cold and effluent water is passed to the equipment. The proportion of cold and effluent water in the mixture depends upon the pressure of the output air from the controller recorder and preferably varies directly as this pressure. Thus, at pressures nearer 3 p.s.i. than 8 p.s.i., the mixture contains a greater proportion of cold water than effluent water whereas at pressures nearer 8 p.s.i. than 3 p.s.i. the mixture contains a greater proportion of effluent water. With an air pressure of about 5 p.s.i. the mixture contains substantially equal proportions of cold and effluent water.

With a pressure of 9 or 10 p.s.i. on the system, effluent water only is passed to the equipment, and neither hot nor cold water is being mixed therewith. When a full 15 p.s.i. or greater pressure is on the system, hot water only is passed to the equipment whereas with a pressure greater than 10 p.s.i. but less than 15 p.s.i. a mixture of hot and effluent water is circulated through the equipment. The proportion of hot and effluent water in the mixture, as mentioned with regard to the mixture of cold and effluent water, depends upon the actual pressure on the system. At pressures near 15 p.s.i., the proportion of hot water is the greater whereas at pressures nearer 10 p.s.i. effluent water is present in a greater amount. It is noted that in the above described operation of the control system, the amount of effluent returned to the hot or chilled water return lines through lines 41 or 42 equals the amount of hot or cold water added by mixing valves 31 and 32. The above-described operation of the valves can be better understood by referring to the following table which indicates the opening of the valve ports at certain critical air pressures.

A more comprehensive understanding of the invention may be obtained by referring to the following illustrative example which is not intended, however, to be unduly limitative of the invention.

A roll mill utilized in the manufacture of solid rocket propellants is provided with a temperature control system similar to that illustrated in the drawing. The operating temperature of the roll mill is to be maintained at about 150° F. The set point of the temperature controller re-

Table

| Air Pressure | Cold Water Valve 31 | | Hot Water Valve 32 | | |
| --- | --- | --- | --- | --- | --- |
| | Ports a—b | Ports c—b | Ports a'—b' | Ports c'—b' | |
| 3 p.s.i. or less | Fully open | Fully closed | Fully closed | Fully open | Cold water only. |
| 4–8 p.s.i. | Partly open | Partly open | ----do---- | ----do---- | Mixture of cold and effluent water. |
| 9–10 p.s.i. | Fully closed | Fully open | ----do---- | ----do---- | All of effluent water being re-circulated. |
| Above 10 p.s.i. | ----do---- | ----do---- | Partly to fully open (down to 10 p.s.i.). | Partly open (up to 15 p.s.i.). | Hot water only 15 p.s.i and above: 11 to 14 p.s.i. mixture of hot and effluent water. | corder which has instrument air supplied thereto at a pressure of 15 p.s.i., is set at 150° F. Since the temperature initially sensed by the controller is less than the set point temperature, a pressure of 15 p.s.i. is placed on the system. With a presure of 15 p.s.i. on the system, hot water only is circulated through the roll mill. As the temperature rises, the output pressure from the controller decreases and the hot water mixing valve operates so that a mixture of hot and effluent water is passed to the roll mill. At approximately 148° F., the controller is supplying about 10 p.s.i. to the system, and both the hot and cold water mixing valves are operating so that effluent water only is being circulated through the roll mill. As product is placed on the mill, the temperature of the mill rises as a result of friction. When the temperature of the effluent water reaches about 152° F., the controller output air pressure is about 8 p.s.i., and the mixing valves operate so that a mixture of cold water and effluent water is passed to the equipment. The temperature control system continues to operate as described above with variations in effluent water temperature so as to maintain the temperature of the roll mill at a substantially constant temperature.

From the above discussion it will be apparent that the temperature control system of this invention offers several advantages over conventional systems. Accordingly, utilization of the control system makes possible the simultaneous operation of a large number of pieces of processing equipment at wide variations in temperature and with small heat gains or losses without the return system carrying the entire load. Furthermore, as a result of providing a closed system, no make-up water is required nor is blow-down necessary.

Another important advantage of the present invention concerns the flexibility of temperature control possible when utilizing the temperature control system. Thus, in the operation of certain processing equipment, it may be desirable to change the temperature of the equipment at specified intervals during the process cycle. For example, in the rubber industry, tire molds are maintained at different temperatures for varying periods of time during heating, curing and cooling of the rubber. By merely resetting the temperature controller recorder at desired intervals, the temperature of the molds can be readily and closely controlled during each step of the process cycle. Furthermore, it is within the scope of the invention to substitute for the temperature controller-recorder shown in the drawing a controller having a programmer associated therewith to automatically change the temperature setting of the controller at specified intervals during the process cycle. When using such instrumentation in conjunction with this invention, the different steps of a process cycle requiring varying temperatures for various periods of times are sequentially and automatically carried out by circulating through the equipment heat exchange liquid of variable temperature as determined by the different settings of the controller. The Brown New-Matic Time-Pattern Controller is an example of a suitable programmer which can be used with this invention. This instrument is manufactured by the Brown Instrument Company of Philadelphia, Pennsylvania.

It will be apparent to those skilled in the art that various modifications of the invention can be made upon study of the accompanying disclosure. Such modifications are believed to be clearly within the spirit and scope of the invention.

We claim:

1. A temperature control system for use with processing equipment comprising, in combination, a first heat exchange means; a first heat exchange liquid supply line connected to the outlet of said first heat exchange means; a first heat exchange liquid return line connected to the inlet of said first heat exchange means; means for continuously circulating heat exchange liquid through said first heat exchange liquid supply and return lines and said first heat exchange means; a second heat exchange means; a second heat exchange liquid supply line connected to the outlet of said second heat exchange means; a second heat exchange liquid return line connected to the inlet of said second heat exchange means; means for continuously circulating heat exchange liquid through said second heat exchange liquid supply and return lines and said second heat exchange means; at least one piece of processing equipment whose temperature is to be controlled; a liquid inlet conduit connected to said equipment; a flow regulating means in said liquid inlet conduit; an effluent outlet conduit connected to said equipment; a temperature control means operatively connected to said effluent outlet conduit; a first liquid mixing means, said means being connected to said effluent outlet conduit and to said first heat exchange liquid supply line; a second liquid mixing means, said means being connected to said first liquid mixing means, said second heat exchange liquid supply line and said liquid inlet conduit, and each said first and second liquid mixing means being operatively connected to said temperature control means; and a liquid diverting means connected to said effluent outlet conduit, said first and second heat exchange liquid return lines and said means being operatively connected to said temperature control means.

2. A temperature control system for use with processing equipment comprising, in combination, a heating means; a hot heat exchange liquid supply line connected to the outlet of said heating means; a hot heat exchange liquid return line connected to the inlet of said heating means; means for continuously circulating heat exchange liquid through said hot heat exchange liquid supply and return lines and said heating means; a chiller; a chilled heat exchange liquid supply line connected to the outlet of said chiller; a chilled heat exchange liquid return line connected to the inlet of said chiller; means for continuously circulating heat exchange liquid through said chilled heat exchange liquid supply and return lines and said chiller; a piece of processing equipment whose temperature is to be controlled; a liquid inlet conduit connected to said equipment; a flow regulating means in said liquid inlet conduit; an effluent outlet conduit connected to said equipment; a temperature controller operatively connected to said effluent outlet conduit; a first liquid mixing means, said means being connected to said effluent outlet conduit and to said chilled heat exchange liquid supply line; a second liquid mixing means, said means being connected to said first liquid mixing means, said hot heat exchange liquid supply line and said liquid inlet conduit, and each said first and second liquid mixing means being operatively connected to said temperature controller; and a liquid diverting means connected to said effluent outlet conduit, said chilled heat exchange liquid return line and said hot heat exchange liquid return line, and said means being operatively connected to said temperature controller.

3. The temperature control system of claim 2 in which means are provided for automatically changing at predetermined time intervals the temperature setting of said temperature controller.

4. A temperature control system for processing equipment comprising, in combination, a source of chilled heat exchange liquid; a source of hot heat exchange liquid; at least one piece of processing equipment with which heat exchange liquid of variable temperature is passed in heat exchange relation; a liquid inlet conduit connected to said processing equipment; a flow regulating means in said liquid inlet line; an effluent outlet conduit connected to said processing equipment; a first three-way mixing valve having first, second and third ports; a second three-way mixing valve having first, second and third ports; first conduit means connecting the first port of said first valve to said source of chilled heat exchange liquid; second conduit means connecting the first port of said second valve to said source of hot heat exchange liquid; third conduit means connecting the second port of said first valve to the third port of said second valve; fourth conduit means connecting the third port of said first valve to said effluent outlet conduit; fifth conduit means connecting the second port of said second valve to said liquid inlet conduit; a three-way diverting valve having first, second and third ports, said second port being connected to said effluent outlet conduit downstream from its connection to said fourth conduit means; sixth conduit means connecting the first port of said diverting valve to said source of chilled heat exchange liquid; seventh conduit means connecting the third port of said diverting valve to said source of hot heat exchange liquid; and temperature control means, said means being operatively connected to said effluent outlet conduit and to each of said mixing and diverting valves.

5. The temperature control system of claim 4 in which said 3-way mixing valves are diaphragm valves adapted to modulate within a set pressure range; said 3-way diverting valve is a diaphragm valve adapted to be in one position at pressures above a set pressure and to be in a second position at pressures below said set pressure; and said temperature control means is adapted to supply a pneumatic signal to the diaphragms of each of said valves, said signal being proportional to the temperature of the effluent liquid in said effluent outlet conduit.

6. A temperature control system for processing equipment comprising in combination, a source of chilled heat exchange liquid, a source of hot heat exchange liquid, at least one piece of processing equipment of which the temperature is controlled by passing heat exchange liquid of variable temperature therethrough in heat exchange relationship with material being processed; a liquid inlet conduit connected to said equipment for introducing heat exchange liquid; an effluent conduit connected to said equipment for removing heat exchange liquid; a flow control means for regulating the flow of heat exchange liquid through said inlet and outlet conduits; a temperature control means operatively connected to said effluent outlet conduit; a first liquid mixing means, said means being connected to said effluent outlet conduit and to one of said sources of heat exchange liquid; a second liquid mixing means, said means being connected to said first liquid mixing means, the remaining source of heat exchange liquid and said liquid inlet conduit to said processing equipment, and each said liquid mixing means being operatively connected to said temperature control means to control the relative amounts of said heat exchange liquids being mixed responsive to changes in the temperature being controlled; and a liquid diverting means connected to said effluent outlet conduit and said sources of heat exchange liquid and said liquid diverting means being operably connected to said temperature control means.

References Cited in the file of this patent

UNITED STATES PATENTS

| | | |
|---|---|---|
| 1,699,296 | Knowland et al. | Jan. 15, 1929 |
| 2,357,706 | Toepperwein | Sept. 5, 1944 |
| 2,555,250 | Schroeder | May 29, 1951 |
| 2,788,264 | Bremer et al. | Apr. 9, 1957 |